(12) United States Patent (10) Patent No.: US 8,907,945 B2
McDaniel (45) Date of Patent: Dec. 9, 2014

(54) INFERRING AND MAINTAINING SYMMETRY RELATIONSHIPS IN A 3-D EDITOR

(75) Inventor: Richard Gary McDaniel, Hightstown, NJ (US)

(73) Assignee: Siemens Aktiengesellschaft, Munich (DE)

( * ) Notice: Subject to any disclaimer, the term of this patent is extended or adjusted under 35 U.S.C. 154(b) by 203 days.

(21) Appl. No.: 13/233,234

(22) Filed: Sep. 15, 2011

(65) Prior Publication Data

US 2012/0078588 A1 Mar. 29, 2012

Related U.S. Application Data

(60) Provisional application No. 61/386,753, filed on Sep. 27, 2010.

(51) Int. Cl.
*G06T 15/00* (2011.01)
*G06T 19/20* (2011.01)
(52) U.S. Cl.
CPC ..................................... *G06T 19/20* (2013.01)
USPC .............................................. 345/419; 703/1
(58) Field of Classification Search
USPC .............. 345/419, 420, 441, 664, 672; 703/1
See application file for complete search history.

(56) References Cited

U.S. PATENT DOCUMENTS

| 6,323,879 | B1 | 11/2001 | Sauerbrei | |
|---|---|---|---|---|
| 7,324,121 | B2 * | 1/2008 | Young | 345/689 |
| 2002/0018061 | A1 * | 2/2002 | Gantt | 345/419 |
| 2007/0091119 | A1 * | 4/2007 | Jezyk et al. | 345/619 |

OTHER PUBLICATIONS

Ansoft, "HFSS: users guide version 10", Jun. 21 2005, Ansoft Corporation.*
European Search Report dated Dec. 23, 2011.

* cited by examiner

*Primary Examiner* — Maurice L McDowell, Jr.

(57) ABSTRACT

A system for controlling symmetry relationships in a three-dimensional (3-D) model is disclosed. The system includes a processor and a memory in communication with the processor. The memory is configured to store processor-executable instructions to identify a prototype object defined within the 3-D model, detect a symmetry object associated on the identified prototype object such that the symmetry object relates to the prototype object based on a differentiation function, quantify a plurality of model parameters associated with the symmetry object such that the plurality of model parameters defines the differentiation function, and couple the prototype object and the symmetry object based such that an update to one of the objects propagates to other object.

20 Claims, 4 Drawing Sheets

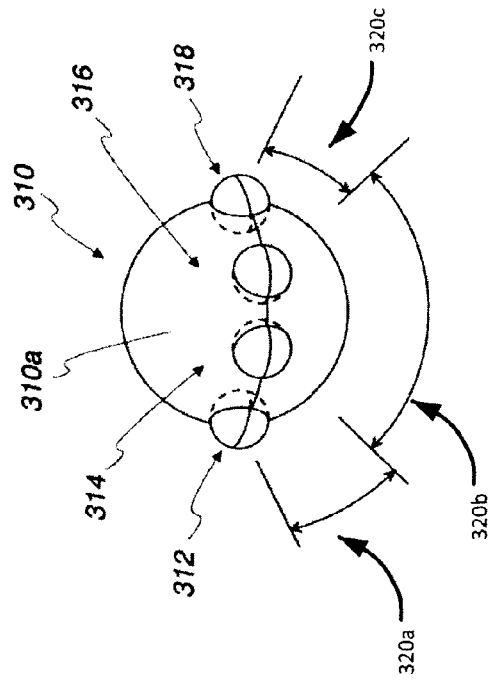

INFERRING AND MAINTAINING SYMMETRY RELATIONSHIPS IN A 3-D EDITOR

CROSS REFERENCE TO RELATED APPLICATIONS

This patent document claims the priority benefit under 35 USC §119(e) U.S. Provisional Application Ser. No. 61/386,753, filed on Sep. 27, 2010, and titled "Inferring and Maintaining Symmetry Relationships in a 3-D Editor." The entire content of this provisional application is hereby incorporated by reference in its entirety.

BACKGROUND

Geometric models often have and integrate one or more symmetric components. These symmetric components may be incorporated and/or interspersed in various areas and aspects of a geometric model. Individual symmetric components include and display a commonality in shape and structure whereby aspects and elements are repeated throughout the geometric model. Known symmetries or symmetrical relationships include reflective symmetry, duplication symmetry, and scaling symmetry. Reflective symmetry describes a symmetrical relationship where the geometry of a first component is the same size and shape as the geometry of a second component but is mirrored and/or reversed about an axis. Duplication symmetry describes a symmetrical relationship where the geometry of a component is repeated, but the orientation and position of the component is different for each instance or copy. Scaling symmetry refers to geometries that have the same elements and topology but are a different size from one another. These known symmetries or symmetrical relationships often occur within different portions or areas of a geometric model.

Known editing and/or interactive modeling systems do not track or monitor symmetries or symmetrical relationships automatically which, in turn, often results in additional editing and modeling effort to generate each geometric model.

SUMMARY

The systems and methods disclosed and discussed in this patent document provides an automated and/or user controlled mechanism for identifying, manipulating and managing symmetry relationships in a three-dimensional (3-D) graphical model. As opposed to simple cut and paste mechanisms, the disclosed systems and method provide a mechanism by which symmetry objects or instances can be linked to a prototype or base object such that a change to any one linked object propagates to the associated linked objects. The disclosed systems and methods further provide for filtering a portion or section of a symmetry object to prevent propagation of changes within the filtered portion to the remaining linked objects.

In one embodiment, a system for controlling symmetry relationships in a three-dimensional (3-D) model is disclosed. The system includes a processor and a memory in communication with the processor. The memory is configured to store processor-executable instructions to identify a prototype object defined within the 3-D model, detect a symmetry object associated on the identified prototype object such that the symmetry object relates to the prototype object based on a differentiation function, quantify a plurality of model parameters associated with the symmetry object such that the plurality of model parameters defines the differentiation function, and couple the prototype object and the symmetry object such that an update to one of the objects propagates to other object.

In yet another embodiment, a computer-implemented method for controlling symmetry relationships in a three-dimensional (3-D) model is disclosed. The method includes identifying, utilizing a symmetry module executed by a processor, a prototype object defined within the 3-D model, detecting, via the symmetry module, a symmetry object associated on the identified prototype object such that the symmetry object relates to the prototype object based on a plurality of model parameters selected from the group consisting of: an x-translation, a y-translation, a z-translation, an orientation and a scale. The method further includes linking, via the symmetry module, the prototype object and the symmetry object based on the plurality of model parameters such that an update to one of the objects propagates to other object.

In yet another embodiment, a computer-implemented method for controlling symmetry relationships in a three-dimensional (3-D) model is disclosed. The method includes identifying a first object defined within the 3-D model, defining a second object associated with a differentiation function, wherein the second object is an instance of the first object, and linking the first object and the second object such that an update to one of the objects propagates to other object in order to maintain a symmetry relationship there between.

Other embodiments are disclosed, and each of the embodiments can be used alone or together in combination. Additional features and advantages of the disclosed embodiments are described in, and will be apparent from, the following Detailed Description and the figures.

BRIEF DESCRIPTION OF THE FIGURES

FIGS. 3A to 3C illustrate examples of objects controlled and managed by the systems and methods disclosed herein;

DETAILED DESCRIPTION

The systems and methods disclosed and discussed in this patent document provide an automated and/or user controlled mechanism for identifying, manipulating and managing symmetry relationships in a three-dimensional (3-D) graphical model. The systems and methods may be implemented on a graphics processing workstation, implemented through a thin-client and server configuration, implemented via one or more networked computers or any other known or later developed system arrangement.

The disclosed system, in contrast to a simple cut and paste mechanism, provides a mechanism by which objects sharing a common symmetry can be linked to a prototype or base object. The prototype may be a randomly selected instance of the object, the first instance of the object, a user-designated instance of the object, or any other identifiable one of the objects sharing a common symmetry. The prototype and the identified objects are linked or otherwise connected to update and change the features or elements of each object in order to maintain the common symmetry. The objects may each be subject to a differentiation function that includes one or more parameters associated with the object. For example, the parameters may include the X, Y and/or Z translation of the object from a fixed point or a relative point defined with respect to the prototype. The parameters may further include a scaling function or value, an orientation, and/or a reflection value relative to the prototype. In other configurations, the parameters could include physical and lighting characteristics of the object such as mass, material, surface roughness, color, reflectivity, transparency and the like.

The disclosed systems and methods further provide for defining a geometry mask that may be utilized to filter a portion or section of a symmetry object to prevent propagation of changes made within the filtered portion to the remaining linked objects. The geometry mask may define a regular or irregular boundary through the symmetry object. The portion of the symmetry object within the outside boundary are maintained in symmetry while the portion outside or within the boundary may be configured locally and customized as desired.

Figure 1:
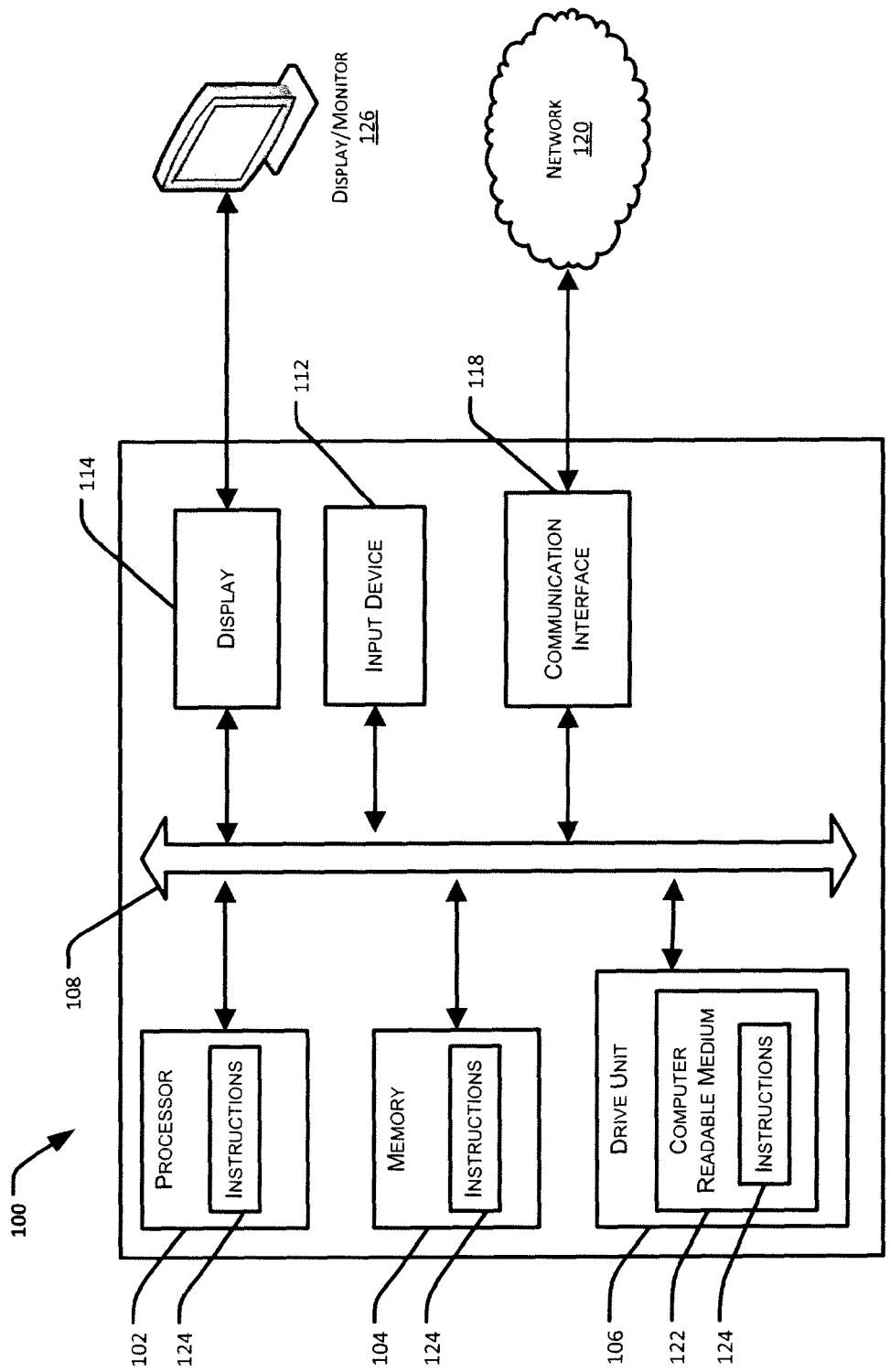
FIG. 1 illustrates a computing system that may be configured to control and manage symmetry relationships in a three-dimensional (3-D) model, according to one embodiment.

FIG. 1 illustrates a layout and configuration for a generalized computer system 100, such as a computer aided design (CAD) workstation, a personal digital assistant (PDA), a tablet computer, a smartphone, a computer, a server, or any of the other computing devices referenced herein. Additional, different, or fewer components may be provided for any specific computing device. The computer system 100 stores and executes algorithms and processor-executable instructions 124 to cause the performance of any one or more of the methods or computer based functions, such as the exemplary symmetry module 200 (see FIG. 2) disclosed herein. The computer system 100 may operate as a standalone device or may be connected to other computer systems or peripheral devices.

In a networked deployment, the computer system 100 may operate as a server or a client computer in a server-client network environment, or as a peer computer system in a peer-to-peer (or distributed) network environment. The computer system 100 may also be implemented as or incorporated into various devices, such as a personal computer (PC), a tablet PC, a set-top box (STB), a personal digital assistant (PDA), a mobile device, a laptop computer, a desktop computer, a communications device, a wireless telephone, a landline telephone, a control system, a camera, a scanner, a facsimile machine, a printer, a pager, a personal trusted device, a web appliance, a network router, switch or bridge, or any other machine capable of executing the processor-executable instructions 124 (sequential or otherwise) that specify actions to be taken to implement the symmetry module. In a particular embodiment, the computer system 100 may be implemented using electronic devices that provide voice, video and/or data communication. Further, while a single computer system 100 may be illustrated, the term "system" shall also be taken to include any collection of systems or sub-systems that individually or jointly execute a set, or multiple sets, of processor-executable instructions to perform one or more functions via the network.

As illustrated in FIG. 1, the computer system 100 includes a processor 102, such as, a central processing unit (CPU), a graphics-processing unit (GPU), or both. The processor 102 may be a component in a variety of systems. For example, the processor 102 may be part of a standard personal computer or a workstation. The processor hardware may incorporate one or more general processors, digital signal processors, application specific integrated circuits, field programmable gate arrays, servers, networks, digital circuits, analog circuits, combinations thereof, or other now known or later developed devices for analyzing and processing data.

The computer system 100 may include a memory 104 that can communicate via a bus 108. The memory 104 can be divided or segmented into, for example, a main memory, a static memory, and a dynamic memory. The memory 104 includes, but is not limited to, non-transitory computer readable storage media and various types of volatile and non-volatile storage media such as: random access memory; read-only memory; programmable read-only memory; electrically programmable read-only memory; electrically erasable read-only memory; flash memory; magnetic tape or disk; optical media and the like. In one case, the memory 104 includes a cache or random access memory for the processor 102. Alternatively, or in addition to, the memory 104 may be system memory that is separated and/or distinct from the processor 102.

The memory 104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 104 is configured to store processor-executable instructions 124 utilizable by the processor 102. The functions, acts or tasks illustrated in the figures or described herein may be performed by the programmed processor 102 executing the instructions 124 including the symmetry module 200 (see FIG. 2) stored in the memory 104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 100 may further include a display driver 114 configured to control the output of a display 126 such as a touchscreen, a liquid crystal display (LCD), an organic light emitting diode (OLED), a flat panel display, a solid state display, a cathode ray tube (CRT), a projector, a printer or other now known or later developed display device for outputting determined information. The display driver 114 acts as an interface between, for example, the display 126 and the processor 102 that allows the interaction with the software (including the processor-executable instructions 124) stored in the memory 104 or in the drive unit 106.

The computer system 100 further includes an input device 112 configured to allow a user to interact with any of the components of system 100. The input device 112 may be a number pad, a keyboard, or a cursor control device, such as a mouse, or a joystick, touchscreen display, remote control or any other device operative to interact with the system 100.

The computer system 100, in other embodiments, includes a disk or optical drive unit 106 to accessibly interpret a computer-readable medium 122 on which software embodying algorithms or processor-executable instructions 124 are embedded. The algorithms or processor-executable instructions 124 perform one or more of the methods or logic as described herein. The instructions 124 may reside completely, or at least partially, within the memory 104 and/or within the processor 102 during execution by the computer system 100. The memory 104 and the processor 102 also may include other forms or configurations of computer-readable media as discussed above.

The computer-readable medium 122 may include processor-executable instructions 124 or receive instructions 124 responsive to a transmitted signal; so that a device connected to a network 120 or other communications means may communicate voice, video, audio, images or any other data over the network 120. Further, the processor-executable instructions 124 may be transmitted or received over the network 120 via a communication interface 118. The communication interface 118 may be implemented in software or may be a physical connection in hardware. The communication interface 118 provides a connection with the network 120, external media, the display driver 114, or any other components in the system 100 or combinations thereof. In one embodiment, the connection with the network 120 is a physical connection such as a wired Ethernet connection or may be established wirelessly such as via a cellular telephone network (GSM, CDMA), an 802.11 (Wi-Fi), 802.16 (WiMax), 802.20 (mobile broadband), 802.15.4 (ZigBee) and/or Bluetooth networks. The network 120 in other embodiments can be a public network, such as the Internet, a private network, such as an intranet, or combinations thereof, and may utilize a variety of networking protocols now available or later developed including, but not limited to TCP/IP based networking protocols.

The computer-readable medium 122 may be a single medium or may comprise multiple mediums such as a centralized or distributed database and/or associated caches and servers that store one or more sets of instructions. The term "computer-readable medium" is generally utilized to describe any medium that may be capable of storing, encoding or carrying an algorithm or set of instructions for execution by a processor or that may cause a computer system to perform any one or more of the methods or operations disclosed herein.

The computer-readable medium 122 may include a solid-state memory such as a memory card or other package that houses one or more non-volatile read-only memories. The computer-readable medium 122 further includes or encompasses random access memory or other volatile re-writable memory. Additionally, the computer-readable medium 122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may use a tangible storage medium. The present disclosure may be considered to include any one or more of a computer-readable medium, other equivalents and successor media, in which data or instructions may be stored.

In other embodiments, dedicated hardware implementations, such as application specific integrated circuits (ASIC), programmable logic arrays and other hardware devices, may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware means for implementing and utilizing the teaching and disclosure presented and discussed herein.

Figure 2:
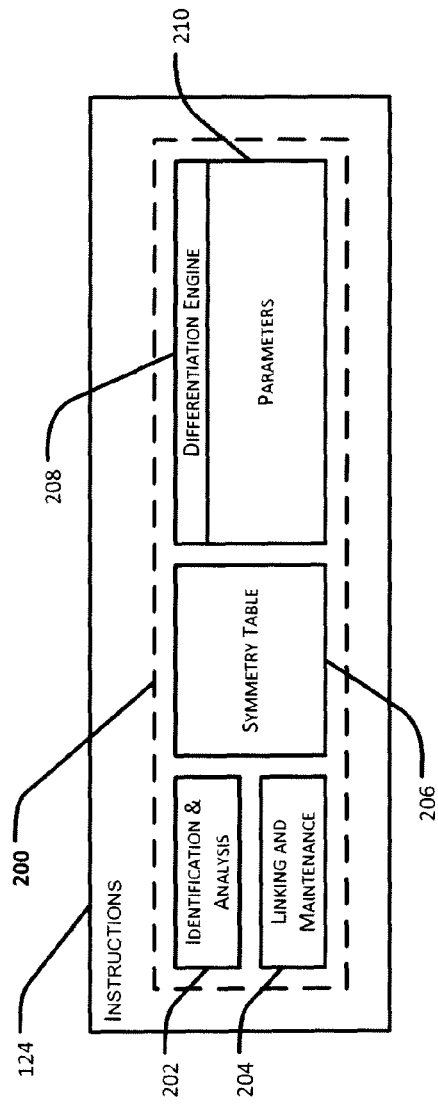
FIG. 2 illustrates a functional block diagram of one embodiment of processor-executable instructions configured to implement a symmetry module.

FIG. 2 illustrates a functional block diagram of processor-executable instructions configured to implement the symmetry module 200. The symmetry module 200 includes, in this exemplary embodiment, an identification and analysis module 202, a linking and maintenance module 204, a symmetry table 206, and a differentiation engine 208 that includes one or more parameters 210.

In this exemplary embodiment, the symmetry module 200 utilizes the identification and analysis module 202 to scan or evaluate a base object or prototype within the model in order to automatically identify a symmetry relationship between one or more objects and the prototype. Alternatively, the symmetry module 200 may utilize the identification and analysis module 202 to prompt the user to manually identify objects on which to infer a symmetry relationship amongst one another or with a base object or prototype. In yet another embodiment, the identification and analysis module 202 may prompt the user to identify or correlate a symmetry relationship of one of the identified objects with the prototype. In another embodiment, the identification and analysis module 202 may prompt the user to create a first instance of the object.

For example, the processor 102 implements and executes the symmetry module portion of the instructions 124 to facilitate the analysis and evaluation of a 3-D model including one or more prototypes, such as the three-dimensional sphere 300 shown in FIG. 3A. The sphere 300 is a basic geometric shape that displays or possesses symmetry across its entire structure. Thus, any given section of the sphere 300 through its center will be symmetric to any of the remaining sections. As used herein, symmetry describes any object or objects that are instances of an original base object or prototype. Symmetry objects are not required to be simple copies of the base or prototype object; rather, symmetry objects may differ from the base object or prototype as directed by a differentiation engine 208 stored and/or operable within the symmetry module 200.

The differentiation engine 208 utilizes a differentiation function to control the properties and presentation of the symmetry objects associated with the prototype. In this exemplary embodiment, the differentiation function is parameterized, which allows each instance or representation of the symmetry object (e.g., the sphere 302 in FIG. 3B and sphere 310 in FIG. 3C) to be modified by a different set or group of parameters 210. For example, the differentiation engine 208 may define a repeated or arrayed object that can be differentiated based on a single parameter, such as a translated position on the X-axis relative to the prototype. In other embodiments, the differentiation engine 208 may utilize one or more parameters 210 to distinguish and customize a symmetry object with respect to the prototype. The parameters 210 may be part of the differentiation engine 208 or may be stored in the memory 204 and accessible via the processor 102. The parameters 210 may include and/or differentiate the symmetry object from the prototype based on, for example, position, orientation, scaling, and reflection.

Figure 4:
FIG. 4 illustrates an example of a symmetry table that may be utilized by the systems and methods disclosed herein.

The linking and maintenance module 204 may utilize or cooperate with the symmetry table 206 to list and identify each of the prototypes and their identified symmetry objects. FIG. 4 illustrates an example of information and parameters 210 that may be stored in the symmetry table 206. For example, figure identification (Figure ID) 01 may be a unique object identification that represents the sphere 300. In this example, the sphere 300 is assumed to be the prototype or base object. Accordingly, the parameters 210 utilized by the differentiation engine 208 may be null values. In particular, the X, Y and Z translation may be assumed to be zero (0), the scale may be set to equal 1 and the overall orientation angle may be 0. Similarly, because the sphere 300, in the present example, is the prototype; there are no cross-references or boundary/geometry masks defined. A boundary/geometry mask operates as a filter to allow portions of the object highlighted by the filter to be customized without replicating those changes to other linked objects or the prototype.

For example, FIG. 3B may correspond to Figure ID 31 listed in the symmetry table 206. In this embodiment, the symmetry object 302 is cross-referenced to the sphere 300. Specifically, the symmetry table 206 indicates that the Figure ID 31 is cross-referenced to Figure ID 01. These identifications may be automatically generated by the symmetry module 200 or may be defined by the user. The symmetry object 302 may, in this example, be associated with parameters 210 that indicate a Y-translation of 25 and a scale of 0.5. The parameters 210 may indicate that the symmetry object 302 is translated along the Y-axis 25 pixels, millimeters or any other distance unit. The translation may be relative to the prototype sphere 300 or may be relative to a fixed point within the model space. The parameters 210 may further indicate that the symmetry object 302 is scaled or decreased by a factor of 0.5 (i.e., the symmetry object 302 is 50% of the size of the prototype sphere 300.)

FIG. 3B and symmetry table 206 further indicate a geometry mask 304 cooperates with the symmetry object 302. In this embodiment, the geometry mask 304 is a vertical plane that bisects the sphere represented by the symmetry object 302. The geometry mask 304 defines and establishes a boundary having an inner boundary 306 and an outer boundary 308. The portion or elements of the symmetry object 302 that are within the inner boundary 306 of the geometry mask 304 are linked to the prototype sphere 300. The portion or elements of the symmetry object 302 within the outer boundary 308 are unlinked from the prototype. Besides using a geometric function, such as a plane, to establish the boundary, the symmetry table may list the elements of the instantiated geometry that constitute the border. For FIG. 3B, the points and arcs constituting the copied portion of the sphere 302 may be associated with the corresponding elements of the prototype. Similarly, the boundary may be defined by listing the elements that are members of the border, marking elements as either out or in. The portion or elements of the symmetry object 302 within the outer boundary 308 may be considered local customizations of the object. Thus, the portions of the object that are not contained by the inner boundary 306 may be manipulated and altered without effecting the any of the linked or cross-referenced objects indicated in the symmetry table 206.

The geometry mask may, in other embodiments, be either a regular or irregular shaped area or construct that encompasses the element or portion of the symmetry object 302 to be customized. The geometry mask allows for local customization that: (1) does not propagate to linked or cross-referenced symmetry objects and prototype; and (2) can exceed or encompass elements not specified by the differentiation function utilized by the differentiation engine 208. In this way, the geometry mask provides additional flexibility and local customization options for each instance of an object utilized within the 3-D model.

FIG. 3C may correspond to Figure ID 97 listed in the symmetry table 206. In this example, the symmetry object 310 is an instance of the sphere 300 that, in turn, includes a plurality of additional instances 312 to 318 based on the prototype sphere 300. In particular, the plurality of additional instances 312 to 318 represent symmetry objects arrayed around the surface 310a of the sphere 300. The arrangement or array of each instance 312 to 318 based on the sphere 300 may be uniquely specified by, for example, the X, Y and Z translations associated with each instance. Alternatively, the array may be specified utilizing a common distance such as, for example a radius R, in conjunction with one or more angles 320a to 320c. In this way, the plurality of symmetry objects or instances 312 to 318 may each be individually defined by the parameters 210 and cross-referenced to the prototype (Figure ID 01). Alternatively, the symmetry table 206 may include a nested entry that individually ties each of the symmetry objects 312 to 318 to the instance of symmetry object 310. In this case, the translations, orientations and scale may be relative to the symmetry object 310. In some cases, it is not necessary to create an intermediate prototype geometry when new instances are created from an instanced object. Each of the symmetry objects 312 to 318, in the present example, are cross-referenced to the prototype (i.e., sphere 300) as opposed to the instance of the symmetry object 310 because the elements of objects 312 to 318 are symmetric to the elements of 300. If the object 310 were modified in some manner such that it was no longer symmetric to object 300, then objects 312 to 318 would have to reference 310 specifically because of its local changes. In this manner, the processing and data handling of the processor 102 and instructions 124 can be enhanced because chains of prototypes are not created when not needed; rather, each linked instance of a symmetry object is associated with the most common base object or prototype that can serve.

In other embodiments, the symmetry objects 310 to 318 are different than the base on which the symmetry objects are placed. For example, a box or other shaped object is used and the symmetry objects 310 to 318 are positioned on the base of a different shape than the symmetry objects 310 to 318 themselves. In yet other embodiments, the symmetry objects 310 to 318 are defined in an arbitrary space or without reference to a base object.

The linking and maintenance module 204 is further configured to establish the cross-reference between symmetry objects and maintain the symmetry there between. For example, if a user modifies the symmetry object 314 shown in FIG. 3C, then each cross-referenced and linked symmetry object 300, 302, 310, 312, 316 and 318 will be similarly modified by the linking and maintenance module 204 in order to maintain the common symmetry. It should be noted that the modification of the symmetry object 314 results in a modification of the base object or prototype (i.e., the sphere 300 shown in FIG. 3A). The modification of the base object or prototype, in turn, effects and updates each of the linked symmetry objects cross-referenced and specified in the symmetry table 206. When an instance object is used to modify the prototype from which it derives, the recursive definition can be resolved by eliminating the final instance's link. For example, in FIG. 3C, if sphere 312 is merged with sphere 310, then sphere 300 will likewise gain a new merged sphere in a similar location. The modification to 300 will affect spheres 314, 316, and 318 but not 312. Because 310 and 312 are both instances of 300, one must lose its inheritance. The linking and maintenance module can use different criteria to choose which link to break such as using the last created object or allowing the user to choose. The link may either be broken entirely or broken implicitly by changing instance's geometry mask so that the modified portion is outside the boundary.

The linking and maintenance module 204 may further store one or more geometric or geometry masks for each instance of the symmetry objects identified in the 3-D model. In operation, if the linking and maintenance module 204 detects a change in a portion of the symmetry object contained within the outer boundary 308, then the linking and maintenance module 204 will not modify the base or prototype. Similarly, if the linking and maintenance module 204 detects a change to one or more of the parameters associated with the differentiation function 208, then the linking and maintenance module 204 changes the parameter for that instance of the symmetry model but does not update the base or prototype.

When the change is one that can be propagated back to the prototype, the linking and maintenance module 204 modifies the prototype object. The modification of the prototype object results in an update and modification of each of the cross-referenced symmetry objects identified in the symmetry table 206. The linking and maintenance module 204 subsequently re-applies the individual differentiation functions to each of the cross-referenced symmetry objects to restore the localized changes indicated by the stored parameters 210.

The symmetry module 200 may prompt, via the display 126, the user to accept the change. The user may, in turn, accept the proposed change or direct the symmetry module 200 to sever the link between the object and the prototype. If the symmetry module 200 is directed to sever the link between the objects, the prototype is returned to the state or configuration prior to the initial change. Links are automatically severed when a modification involves multiple instances of the same prototype such that applying the differentiation would cause a loop. The user may also choose to sever a link before modification to direct the symmetry module to a desired configuration.

Upon severance of the link between the object and the prototype, the linking and maintenance module 204 can delete or remove the geometry mask associated with the object. Alternatively, if the linking and maintenance module 204 determines that the geometry mask encompasses the entire object (i.e., if no part of the prototype remains a part of the symmetry object), the link between the object and the prototype may be automatically severed and the cross-reference removed from the symmetry table 206. In this way, the geometry mask may be manually configured to encompass the object and thereby sever the relationship between the object and the prototype.

Figure 5:
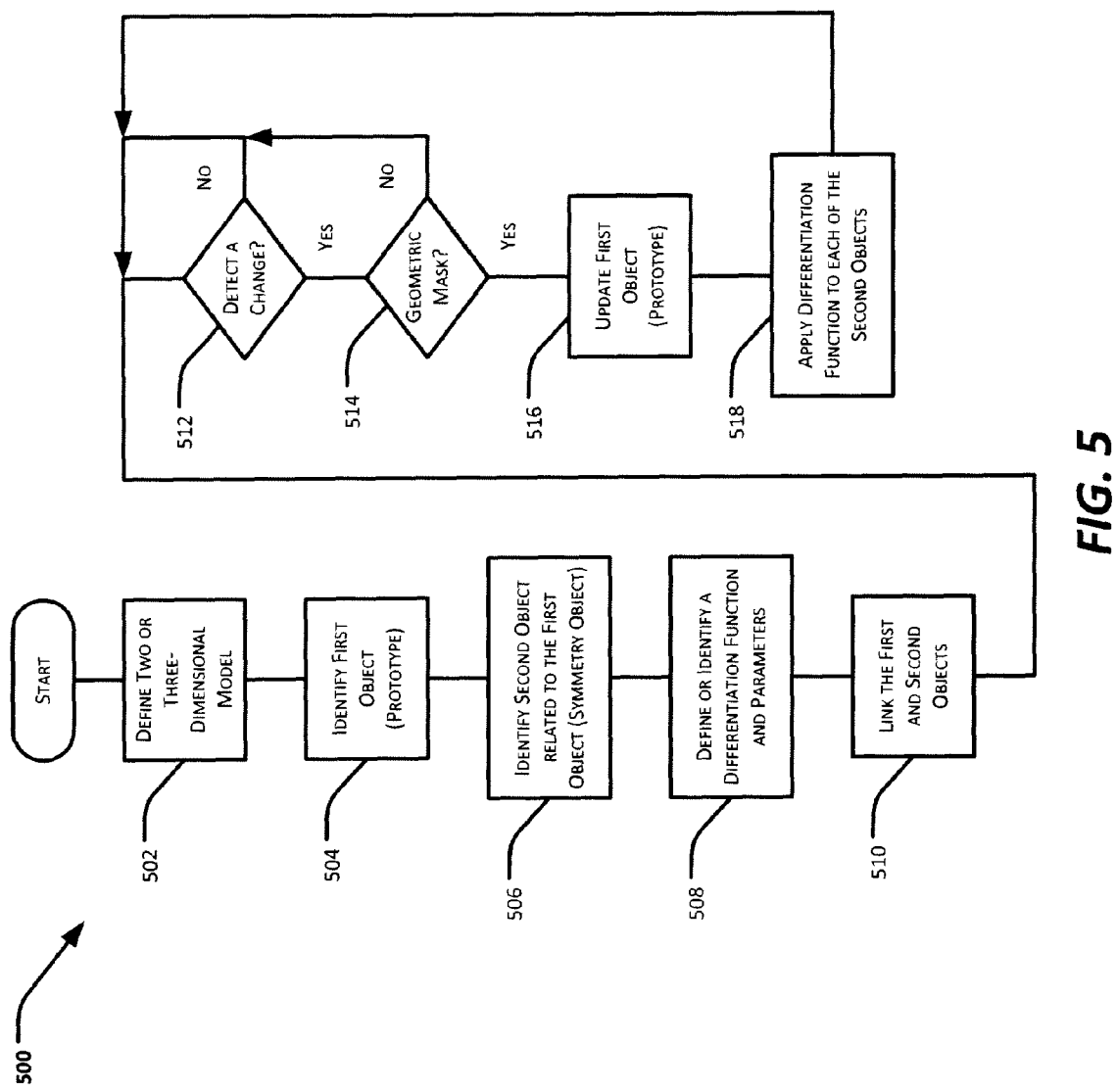
FIG. 5 is a flowchart depicting an embodiment of the operations and processes that may be implemented by the systems and methods disclosed herein.

FIG. 5 is a flowchart 500 illustrating an exemplary operation of the symmetry module 200 implemented according to the teaching and disclosure provided herein. In one embodiment, the symmetry module 200 may be implemented as a part of the design and definition process of a three-dimensional model on, for example, a computer aided design (CAD) workstation that includes the computer system 100 (502). The symmetry module 200 may automatically, or in response to a command provided by the user, scan or otherwise detects a first object or prototype that can provide the basis upon which a symmetry relationship may be established (504). In one embodiment, the user may specifically identify the first object or prototype from elements or components present within the three-dimensional model. In another embodiment, the user may select or indicate the first object or prototype from a list of elements or components compiled by the symmetry module 200. In yet another embodiment, the user creates the first object.

The symmetry module 200 next identifies, either manually or automatically, a second object or instance that possesses the same symmetry as the first object or prototype (506). This common symmetry between the prototype and one or more objects within the three-dimension model provides the basis for the symmetry relationship. Alternatively, the user causes the creation of the symmetric object from the first object. The symmetry module 200 may next utilize the identification and analysis module 202 to determine a differentiation function applicable and/or associated with the identified second object. The differentiation function defines one or more parameters 210 such as, for example, the translation, scale, orientation that may be applied to the second object by the differentiation engine 208 (508).

The identified and parameterized objects can, at this point, be linked or cross-referenced by the identification and analysis module 202 (see FIG. 4) and stored in the symmetry table 206 (510). Once the first and second objects are linked, changes or customizations made to any one of the objects are propagated to each of the remaining objects to maintain the symmetry relationship. The extent of the linkage is determined by the shape and configuration of the geometry mask defining a boundary around elements or components of each object.

After defining the symmetry relationship between the objects and elements in the model, the symmetry module 200 loops or waits until a change in one of the linked objects is detected (512). Upon detection of a change or customization to one of the objects, the symmetry module 200 determines if the change occurred in the inner boundary 306 or outer boundary 308 defined with respect to the geometry mask 304. If the change occurred in the outer boundary 308, the change is defined as a local customization and the symmetry module 308 re-enters (see 512) the detection loop (514). A local customization represents a change or modification that is not propagated between each of the cross-referenced and linked objects. However, if the change occurred in the inner boundary 306, the change is propagated throughout the linked objects (516). The differentiation function can be reapplied to the each of the objects once the change has been propagated through the prototype object (518). The symmetry module 308 upon completion of the propagation and updating process re-enters the detection loop (see 512). By defining each of the objects with reference to a common base object or prototype, any change that affects the prototype will necessarily propagate to update the cross-references symmetry objects. This configuration eliminates the need for individual updates to each of the symmetry objects that, in turn, increases the processing efficiency of the processor 102. Instead, the updated prototype is subjected to the differentiation function by the differentiation engine 208 to return it to a localized condition. In this way, the operation of the computer system 100 and the processor 102 can be efficiently utilized.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A system for controlling symmetry relationships in a three-dimensional (3-D) model, the system comprising:
   a processor; and
   a memory comprising a non-transitory medium in communication with the processor, the medium including instructions that when executed by the processor are configured to cause the system to:
   identify a first object defined within the 3-D model, wherein the first object is designated a prototype object;
   detect a second object associated with the identified prototype object, wherein the second object is a symmetry object that relates to the prototype object based on a differentiation function;
   quantify a model parameter associated with the symmetry object, wherein the model parameter define the parameters of the differentiation function; and
   couple the prototype object and the symmetry object such that the prototype object and the symmetry object remain different objects and an update to one of the objects propagates as a same update to the other one of the objects.

2. The system of claim 1, wherein the processor-executable instructions to identify the first object are further configured to:
identify the first object based on a user input received through an input device selected from the group consisting of: a tablet interface, a touchscreen interface, a mouse interface, and a spherical interface.

3. The system of claim 1, wherein the processor-executable instructions to identify the first object are further configured to:
automatically identify the first object based an analysis of one or more geometric elements of the first object with respect to one or more geometric elements of the second object.

4. The system of claim 1, wherein the plurality of model parameters is selected from the group consisting of: an x-translation, a y-translation, a z-translation, an orientation and a scale.

5. The system of claim 1, wherein the processor-executable instructions are further configured to:
decouple the prototype object and the symmetry object such that a change to the symmetry object does not propagate to the prototype object.

6. The system of claim 1, wherein the processor-executable instructions are further configured to:
define a geometry mask associated with the symmetry object, wherein the geometry mask defines an inner boundary associated with the symmetry object and an outer boundary and is configured to filter a bounded portion of the symmetry object to prevent propagation of changes made within the filtered portion of the symmetry object to the prototype object.

7. The system of claim 6, wherein the outer boundary of the geometry mask delineates a customizable portion of the symmetry object.

8. The system of claim 6, wherein the processor-executable instructions are further configured to:
update the inner boundary of the geometry mask to include a user-implemented change associated with the symmetry object.

9. The system of claim 8, wherein the processor-executable instructions are further configured to:
decouple the prototype object and the symmetry object when the inner boundary of the geometry mask encompasses the entire symmetry object such that no portion of the symmetry object is derived from the prototype object.

10. A computer-implemented method for controlling symmetry relationships in a three-dimensional (3-D) model, the method comprising:
identifying, utilizing a symmetry module executed by a processor, a prototype object defined within the 3-D model;
establishing, via the symmetry module, a symmetry object based on the identified prototype object, wherein the prototype object relates to the symmetry object as modified by a plurality of parameters selected from the group consisting of: an x-translation, a y-translation, a z-translation, an orientation and a scale;
linking, via the symmetry module, the prototype object and the symmetry object such that an update to one of the objects propagates to other object; and
defining, via the symmetry module, a geometry mask associated with the symmetry object, wherein the geometry mask defines an inner boundary associated with the symmetry object and an outer boundary and is configured to filter a bounded portion of the symmetry object to prevent propagation of changes made within the filtered portion of the symmetry object to the prototype object.

11. The method of claim 10 further comprising:
receiving a user input identifying the prototype object through an input device selected from the group consisting of: a tablet interface, a touchscreen interface, a mouse interface, and a spherical interface.

12. The method of claim 10, wherein identifying the prototype object further comprises automatically identifying the prototype object based an analysis of one or more geometric elements of the prototype object with respect to one or more geometric elements of the symmetry object.

13. The method of claim 10, wherein linking the prototype object further comprises delinking the prototype object and the symmetry object such that a change is limited to the symmetry object.

14. The method of claim 10, wherein a portion of the symmetry object delineated by the outer boundary is independent of the prototype object.

15. A computer-implemented method for controlling symmetry relationships in a three-dimensional (3-D) model, the method comprising:
identifying a first object defined within the 3-D model;
defining a second object utilizing a differentiation function, wherein the second object is an instance of the first object; and
linking the first object and the second object such that an update to one of the objects propagates to other object in order to maintain a symmetry relationship there between.

16. The method of claim 15 further comprising:
detecting the symmetry relationship between the first object and the second object, wherein the symmetry relationship is automatically detected.

17. The method of claim 15, wherein the differentiation function includes a plurality of model parameters selected from the group consisting of: an x-translation, a y-translation, a z-translation, an orientation and a scale.

18. The method of claim 15 further comprising:
defining a boundary associated with the second object, wherein the boundary includes an inner boundary associated with the second object and an outer boundary.

19. The method of claim 18, wherein a portion of the second object associated with the outer boundary is independent of the first object.

20. The method of claim 15, wherein the differentiation function includes at least one parameter that modifies the second object with respect to the first object.

* * * * *